May 26, 1931. F. H. STONER 1,807,182
DISK CULTIVATOR
Filed Sept. 18, 1930
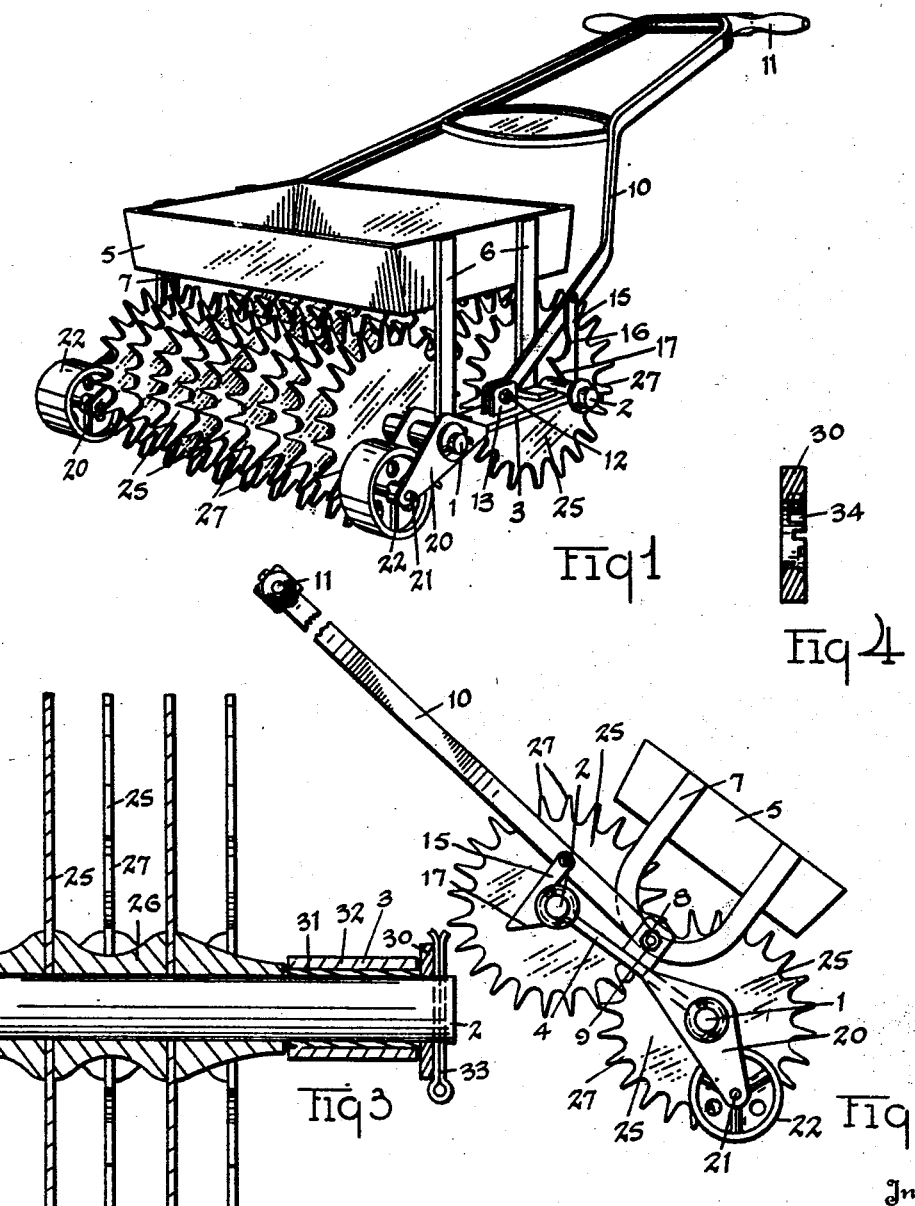

Patented May 26, 1931

1,807,182

UNITED STATES PATENT OFFICE

FRANK H. STONER, OF MONROE, MICHIGAN

DISK CULTIVATOR

Application filed September 18, 1930. Serial No. 482,799.

My invention has for its object to provide a lawn or green cultivator which is so constructed that in its operation on the lawn, the grass and its roots will not be injured but portions of the sod will be lifted to enable loosening of the soil and aeration of the roots. The invention particularly provides a means for puncturing the sod and, as the cultivator moves over the green, it operates to loosen the dirt by the swinging movement of spike-like projections or teeth that extend to points beneath the surface of the sod and beneath the rolling surfaces on which the cultivator is supported.

The invention provides other features and advantages which will appear from the following description and upon examination of the drawings. Structures containing the invention may be varied in their details and still embody the invention. To illustrate a practical application of the invention, I have selected a cultivator that embodies the invention as an example of various structures and details thereof that contain the invention, and shall describe the selected structure hereinafter, it being understood that variations may be made without departing from the spirit of the invention. The particular structure selected is shown in the accompanying drawings.

Fig. 1 is a perspective view of the cultivator. Fig. 2 is a side view of the cultivator. Fig. 3 illustrates a view of a section of one of the shafts that supports a plurality of the pointed disks of the cultivator. Fig. 4 is a view of a section of an adjustable washer for limiting the play of the disks on each shaft of the cultivator.

In the particular cultivator shown in the drawings, a pair of shafts 1 and 2 are secured to a pair of plates 3 and 4 that are tiltable relative to each other to provide for the depressions and elevations in the surface of the ground or sod over which the cultivator is moved. A weight is supported on the plates 3 and 4 to produce the desired pressure on the shafts 1 and 2 for forcing the teeth of the cultivator into the ground the desired depth.

Any suitable material, having the desired weight, may be supported in a suitable pan 5 that is connected to the plates by means of the bars 6, located at one end of the pan, and the U-bar 7 located at the other end of the pan. The U-bar 7 is connected by means of a pin 8 to a bracket 9 while the bars 6 are connected to the plate 3 at points near its ends. The pan 5 is thus provided with a 3-point support and, consequently, is movable relative to the plate 4, or permits movements of the plate 4, relative to the pan 5 and the plate 3, to enable movement of the plates relative to each other and, consequently, movement of the ends of the shafts 1 and 2, relative to each other, as the cultivator is moved over the elevated and depressed portions of the green.

A handle member 10, having a handle 11, is pivotally connected to the plates 3 and 4. It is connected by the pin 8 to the bracket 9 which is secured to the plate 4 and to the pin 12 which is located in the bracket 13 that is connected to the plate 3. The member 10 is formed of strap iron. It is sufficiently flexible to allow tilting movements of the plates 3 and 4 relative to each other. The handle member is provided with a pair of hooks 15 having curved edge portions 16 for engaging the ends of the shafts 2, and an inclined edge portion 17 for forcing the hooks 15 rearwardly when the handle is sufficiently lowered. The points of connection of the hooks 15, with the handle member 10, are such that the weight of the hooks 15 will automatically cause the hooks 15 to swing into engaging position relative to the shaft 2 when the handle member is lowered sufficiently.

The ends of each of the plates 3 and 4 are provided with a pair of brackets 20. The ends of the brackets 20 are provided with pins 21 on which are located the rollers 22. The pins 21 are located ahead of the shafts 1 and 2 which positions the rollers 22 so that when the hooks engage and the handle 11 is raised sufficiently, the cultivator may be supported on the rollers 22 to thus freely move over the sidewalks, lawn or sod without causing contact of the teeth of the cultivator.

The cultivator is provided with a plurality of disks 25 that may be rotated relative to each other on the shafts 1 and 2, although the disks are so secured to the shaft that such rotation is yieldingly resisted by the friction between the parts that secure the disks in their relative positions. The rotation of the disks, relative to each other, enables turning the cultivator without dragging the disks over the sod. The disks are spaced apart by means of the spools 26 and the disks on the shaft 1 are so located as to be staggered with reference to the disks on the shaft 2, that is, the plane of the disks on the shaft 1 extend midway between adjoining disks of the shaft 2. The disks are provided with relatively long spikes or teeth 27 that penetrate well below the surface of the sod and pierce the sod at separated points to a point well below the surface and to near the lower ends of the roots of the grass. Owing to the fact that the disks roll on the surface of the sod, and the points of the spikes or teeth are located well below the sod, the spikes or teeth operate to lift and loosen the dirt as the spikes leave the sod. The disks of the rear shaft 2 not only provide for horizontally supporting the body of the cultivator, and enable its free movement by pushing or pulling the cultivator, but also operate to further loosen the soil about the roots of the grass subsequent to the operation of the disks on the shaft 1 on the soil, that is, the spikes or teeth on the disks, supported on the shaft 2, further loosen the dirt and afford aeration of the roots as the cultivator moves over the sod.

The disks are maintained in frictional contact with the ends of the spools 26 to enable movement of the disks relative to each other by means of a washer 30 which is located on the end of each of the shafts 1 and 2. The bushing 31 is located in the bearing 32 that may be formed at the ends of the plates 3 and 4 for rotatably supporting the shafts 1 and 2. The bushing 31 has a length somewhat greater than the length of the bearing part 32. The washer 30 is located on the end of each shaft and a cotter pin 33 is inserted through the end of the shaft to press the washer 30 against the bushing 31, the bushing 31 operating to press the spools 26 endwise and against the disks, to thus frictionally and yet yieldingly resist rotation of the disks relative to each other, or relative to the shaft on which they are located. Preferably, the washer 30 is formed relatively thick and is castellated to form notches 34 of different depths for the receipt of the cotter pin 33. This provides for adjustment of the play as between the ends of the spools and the surfaces of the disks, and to adjust the frictional contact between these surfaces.

I have thus provided an exceedingly efficient lawn cultivator that may be made at a very low cost of production and yet one which may be exceedingly efficient in the cultivation of lawns and the preservation of their beauty.

I claim:

1. In a disk cultivator, a pair of shafts, a pair of end members connected to the ends of the shafts, the end members movable relative to each other, a plurality of disks rotatably supported by the shafts and having teeth projecting from the peripheries of the disks, a part for operating the cultivator connected to the end members.

2. In a disk cultivator, a pair of shafts, a pair of end members connected to the ends of the shafts, the end members movable relative to each other, a plurality of disks rotatably supported by the shafts and having teeth projecting from the peripheries of the disks, a handle part for operating the cultivator and pivotally connected to the end members, the end members having brackets and rollers located on the brackets, the handle part having hooks for lifting the shafts and the end members for moving the cultivator on the rollers.

3. In a disk cultivator, a pair of shafts, a pair of end members connected to the ends of the shafts, the end members movable relative to each other, a plurality of disks located on the shafts and having teeth projecting from the peripheries of the disks, a plurality of spacing hubs located on the shafts and between the disks and means for adjustably clamping the spacing hubs and the disks to yieldingly frictionally resist rotation of the disks relative to each other.

4. In a disk cultivator, a pair of shafts, a pair of end members connected to the ends of the shafts, the end members movable relative to each other, a plurality of disks secured to the shafts and having teeth projecting from the peripheries of the disks, a handle part for operating the cultivator and pivotally connected to the end members, and a weight supporting frame, a means for connecting the frame at a single point to one of the end members, and a means for connecting the other end of the frame at two points to the other end member for supporting the frame.

In witness whereof I have hereunto signed my name to this specification.

FRANK H. STONER.